United States Patent [19]

Kaye et al.

[11] 4,288,748
[45] Sep. 8, 1981

[54] METHOD FOR TESTING METAL DETECTORS

[76] Inventors: Robert M. Kaye, 1309 S. Columbus St., Arlington, Va. 22204; Gary A. Eiloo, 9089 Brook Ford Rd., Burke, Va. 22015; Thomas Tucker, 1740 Tucker Rd., Oxon Hill, Md. 20022

[21] Appl. No.: 931,938

[22] Filed: Aug. 7, 1978

Related U.S. Application Data

[62] Division of Ser. No. 718,345, Aug. 27, 1976, Pat. No. 4,144,486.

[51] Int. Cl.³ .................... G01V 3/12; G01R 35/00
[52] U.S. Cl. .................... 324/326; 324/202; 455/226
[58] Field of Search .................... 325/67, 15, 133, 16, 325/325, 363; 324/3, 6, 202, 74, 130, 326–329, 334–337; 343/17.7; 455/67, 115, 226

[56] References Cited

U.S. PATENT DOCUMENTS

| | | | |
|---|---|---|---|
| 2,079,205 | 5/1937 | Gillett | 325/67 |
| 2,242,312 | 5/1941 | Machts | 324/3 |
| 2,421,016 | 5/1947 | Deloraine et al. | 325/67 X |
| 2,776,365 | 1/1957 | White | 325/67 |
| 3,009,057 | 11/1961 | Glaser | 325/133 |
| 3,461,385 | 8/1969 | Bayer | 324/130 |
| 3,667,045 | 5/1972 | Combs | 325/15 |
| 3,697,876 | 10/1972 | Robbins et al. | 325/133 X |
| 3,737,782 | 6/1973 | Pierce | 325/133 X |
| 3,826,976 | 7/1974 | Winston et al. | 324/202 X |
| 3,970,940 | 7/1976 | Venn | 325/133 X |
| 4,048,564 | 9/1977 | Gleeson | 325/133 X |

Primary Examiner—Gerard R. Strecker

[57] ABSTRACT

An apparatus and method for testing low-power, low-band radio frequency metal detectors of the type employing a radio transmitter alone or a transmitter and a receiver. The apparatus is characterized by a variable voltage power supply, a transmitter, an antenna, a voltmeter, a rectifier connected to the voltmeter, a switch for connecting the rectifier to either the antenna or the power supply and for selectively energizing the transmitter, and a surface placed in a fixed position relative to the antenna and defining the proper position for placement of the equipment under test.

1 Claim, 4 Drawing Figures

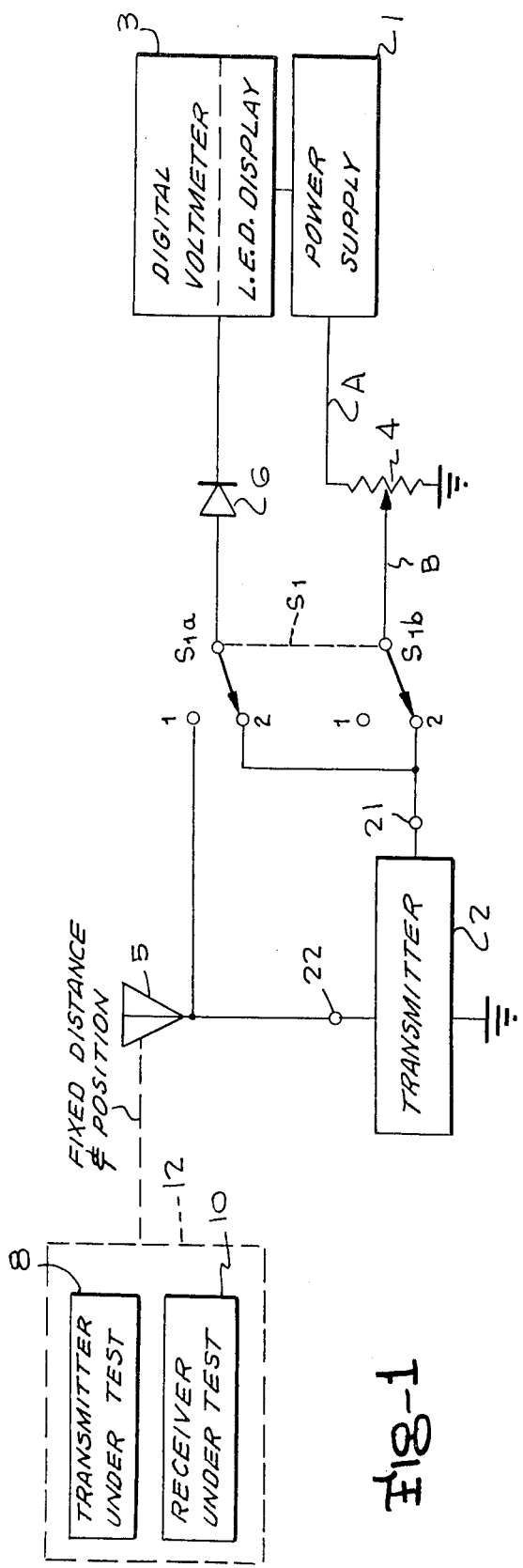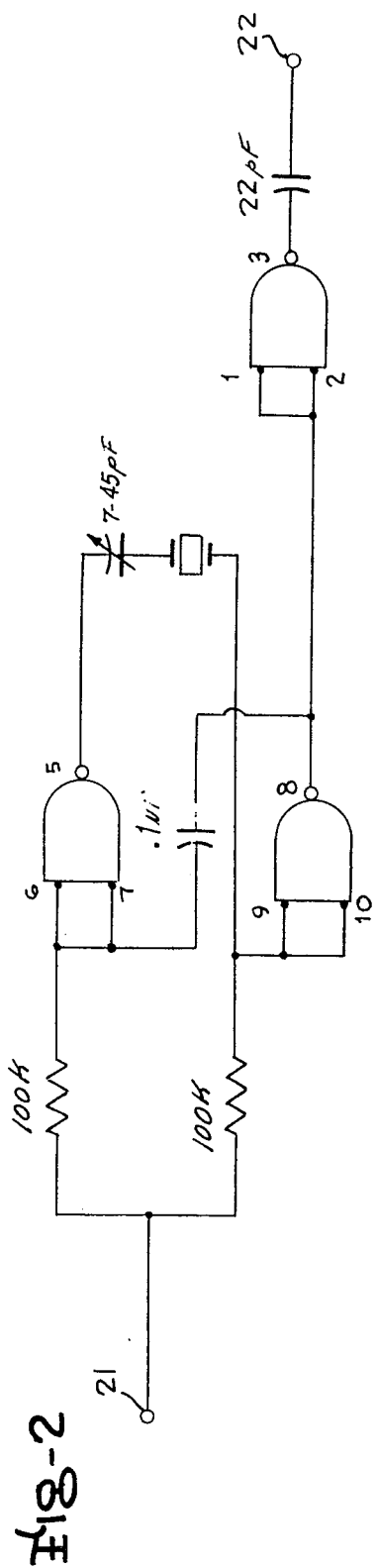

METHOD FOR TESTING METAL DETECTORS

This is a division of application Ser. No. 718,345, filed Aug. 27, 1976, now U.S. Pat. No. 4,144,486.

BACKGROUND OF THE INVENTION

1. Field of the Invention

This invention relates to the field of radio receiver and transmitter calibration and testing equipment and, more particularly, to an apparatus and method suitable for the calibration and testing of low-power, low-band radio frequency radio receivers and transmitters of the type used for detecting buried or hidden metal objects.

2. Description of the Prior Art

It has been customary in the past to use complex and expensive laboratory type equipment such as digital frequency counters, R.F. watt meters, signal generators, calibrated attenuators and the like for the purpose of calibrating and testing metal detection equipment of the type employing a transmitter alone or a receiver and a transmitter. This equipment is normally expensive, bulky and difficult for the unskilled to meaningfully utilize. Therefore, when such metal detection apparatus has failed to function correctly in the field as determined by the operator attempting to locate hidden or buried metal objects; it has heretofore been necessary for the operator to take the malfunctioning equipment to a trained technician in order to determine which unit was defective, if any, or to have either the receiver or the transmitter or both recalibrated.

In a commercial setting, where the operator might be a utility company worker attempting to locate buried pipes, cables and so forth, the operator's time lost due to the suspected malfunction would not only give rise to a non-productive overhead expense, but it would also mean that the task to have been performed by the operator would have been postponed for some time. The operator would have to return to his dispatch point, obtain substitute equipment and return to the job site. Assuming the substitute equipment was properly functioning, only then could he perform the task at hand. If there had been any urgency attached to that task, the time delay could have had serious consequences.

If the object sought to be located by the utility company had been a pipe suspected to be leaking gas, the gas leak could continue for quite some time unabated while substitute equipment was being brought to the site. Alternatively, if it is not realized that the metal detecting equipment is not operating properly, the operator might fail to detect the presence of a buried pipe or cable, commence digging under the misconception that it was safe to do so, and rupture a gas main, destroy utilities cables, or cause other undesirable results. Thus, it is important that there be a simple to operate, in-the-field test device for determining whether the metal detection equipment might be malfunctioning or whether the inability of the equipment to locate the metal object sought for is actually due to the absence of metallic objects.

Also possible as an alternative to in-the-field testing is the use of the same or similar test apparatus at a dispatch point prior to the metal detection equipment being taken into the field for use. We have determined that the most frequent causes of metal detector malfunction are maladjustment and weakened batteries. Therefore, periodic dispatch point testing will obviate the majority of in-the-field equipment failures, while permitting one test device to be used to service many metal detectors.

Metal detector equipment malfunctions are of three basic types. The first type includes malfunctions in the receiver apparatus. The second type encompasses malfunctions in the transmitter apparatus. A third type involves those situations in which the transmitter and receiver are independently correctly functioning but fail to coact as intended such as, for example, when one of the units is misaligned or misadjusted. The invention disclosed herein is usable for detecting any and all of these conditions and for correcting some problems of the third type.

SUMMARY OF THE INVENTION

The invention which we describe herein is usable by individuals untrained in electronics for the purpose of performing simple, rapid and accurate tests to determine whether metal detection apparatus of the type employing a low-power, low-band radio frequency transmitter alone or such a transmitter and receiver is functioning well enough to detect hidden or buried metal objects.

It is a principal object of this invention to provide an apparatus usable by individuals untrained in electronics for the purpose of determining the operational status of a metal detector of the type employing a transmitter alone or a transmitter and receiver.

It is another object of this invention that such apparatus be lightweight, compact, and suitable for in-the-field operation.

Still another object of this invention is to provide an apparatus usable by individuals untrained in electronics for the purpose of facilitating the accurate tuning of metal detectors of the type employing a transmitter alone or a transmitter and a receiver.

Our invention comprises an apparatus and method capable of achieving these objectives. Briefly, we have provided a receiver for testing the transmitter section of a metal detector, a transmitter for testing the receiver section of a metal detector to be tested, a visual indicator for displaying the condition of the instrument evaluated, an antenna designed to be resonant to the frequency in use, and a surface adapted to maintain a desired relative physical placement between the metal detector to be tested and the electrical apparatus used to perform the testing functions to thereby maintain a constant field strength for any given signal value being transmitted.

DESCRIPTION OF THE FIGURES

FIG. 1 is a combined block-circuit-diagrammatic representation of a first preferred embodiment of the invention.

FIG. 2 is a circuit diagram of a transmitter circuit suitable for use in the invention.

DESCRIPTION OF A PREFERRED EMBODIMENT

Figure 3:
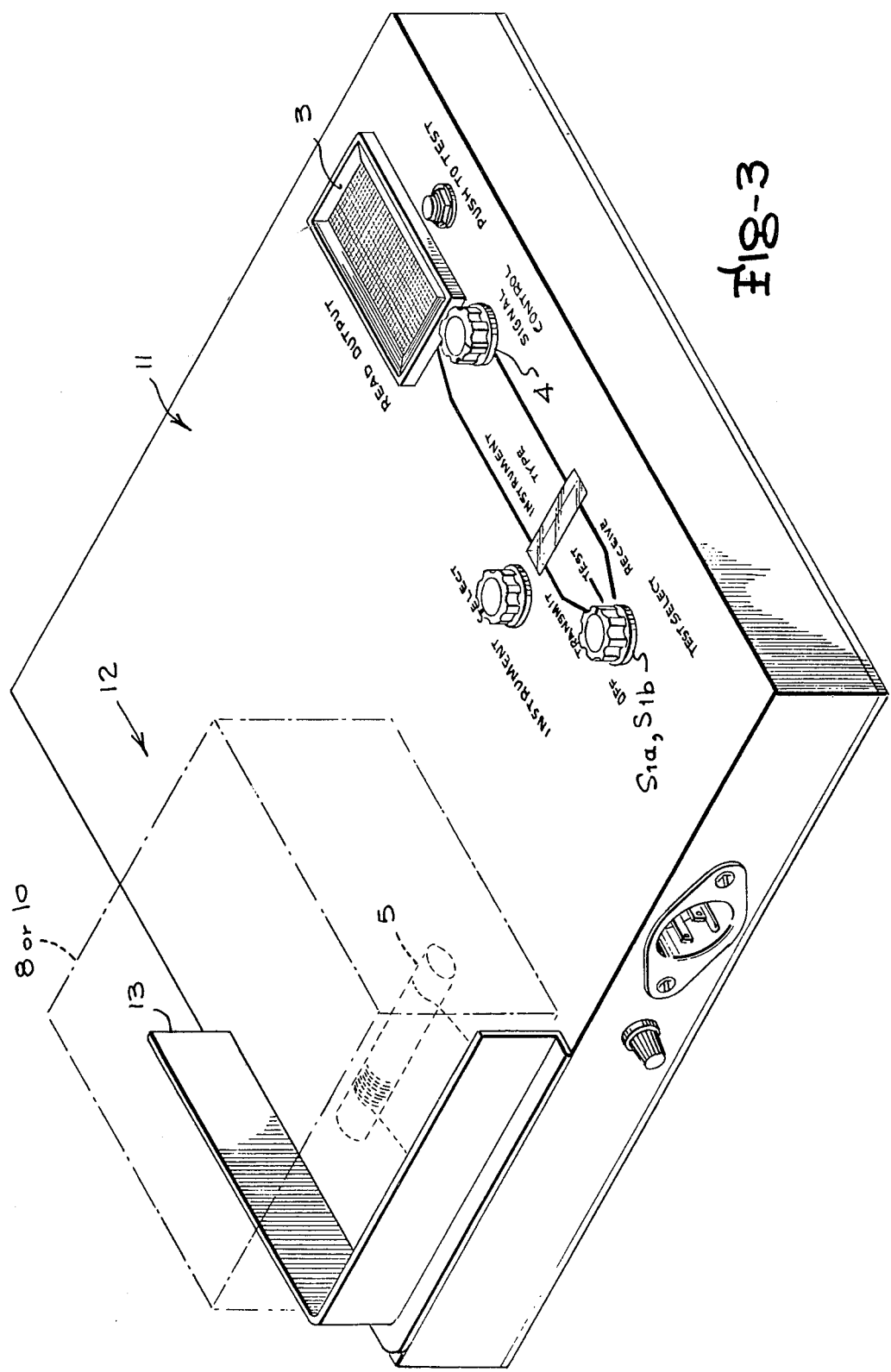
FIG. 3 is a plan view of the invention drawn in perspective.

FIG. 1 depicts our invention in a composite block-circuit-diagrammatic form. Power supply 1 may be any suitable power supply capable of supplying the power required to operate transmitter 2 and digital voltmeter 3. Using current integrated circuit technology, as in the embodiment shown, voltages of plus 5, plus 15 and minus 15 volts DC will be required. It will be appreciated by those skilled in the art that power supply 1 can derive the desired voltages either from a DC source, such as batteries or an automotive electrical system, or from a conventional 117 volt AC utility power main; such power supply circuitry being well-known to those skilled in the electronics field, we shall not go into a detailed circuit discussion here.

Voltage is supplied from power supply 1 to transmitter 2 via a potentiometer 4 and switch S1b. A first end of the resistance element of potentiometer 4 is connected to the output of power supply 1 at which a voltage A is provided. A second end of the resistance element of potentiometer 4 is connected to a common reference ground point. The moveable wiper contact of potentiometer 4 is connected to the pole contact of ganged switch S1b, the throw of which corresponding to position 2 is connected to transmitter 2, at terminal 21 so that power is supplied to transmitter 2 with S1b in position 2. The voltage B appearing at the wiper of potentiometer 4 is adjustable between 0 volts (reference ground) and voltage level A, the precise value depending upon the position of the wiper arm relative to the potentiometer resistance element.

Transmitter 2 comprises a low-power, low-band radio frequency oscillator circuit the output of which, at terminal 22, is coupled to an antenna 5 intended to be resonant at the output frequency of the transmitter. For the testing of metal detection equipment of the type presently commercially available, transmitter frequencies would typically be 100 or 480 kHz, as most commercial metal detectors operate on these frequencies. Commercially available metal detection equipment typically utilize frequencies below 500 kHz. in order to avoid interference from the Standard Broadcast band commercial radio stations, and input powers of significantly less than 100 mW. are frequently employed, since transmitter input powers of up to 100 mW. can be used without prior licensing or approval by the Federal Communications Commission provided that transmitter frequency is maintained below 1.6 MHz.

In general, it is also desirable that transmitter 2 be of a design which will emit a modulated output signal having an audio frequency or other suitable modulation. This qualification becomes necessary when testing receiver units which are intended to be used with such modulated signals, if the receiver lacks other output means such as a meter.

A transmitter or oscillator circuit suitable for use in our invention is shown in FIG. 2 and may be constructed from any of a number of commercially available integrated circuit "chips," such as a Motorola MC724P chip; however, this circuit provides an unmodulated output only and should not be used if the receiver under test requires a modulated signal.

Antenna 5 comprises a loop antenna wound on a ferrite core, providing a very compact arrangement. In this preferred embodiment antenna 5 is connected to the output of transmitter 2 and to the throw of switch S1a corresponding to position 1 of said switch. The pole of switch S1a is connected to the anode of diode 6. The cathode of diode 6 is connected to the input terminal of digital voltmeter 3. It is to be understood, however, that the polarity of diode 6 would be reversed if a negative supply voltage were to be required by transmitter 2.

The throws of switches S1a and S1b corresponding to position 2 are both connected together. With S1a, S1b in position 1, the apparatus is usable for testing transmitters, while with S1a, S1b in position 2, receivers can be tested. Specifically, when S1a, S1b are in position 1, transmitter 2 receives no power and is inoperative. If a transmitter-under-test 8 is transmitting a signal at the frequency to which antenna 5 is resonant, an alternating voltage will appear across antenna 5 and it will be received and switched through S1a onto the anode of diode 6. Diode 6 will rectify the alternating current waveform and the voltage of the rectified waveform will be displayed by digital voltmeter 3.

To test a receiver S1a, S1b are switched to position 2, thereby disconnecting antenna 5 from diode 6 and connecting the wiper of potentiometer 4 through S1b to transmitter 2 and through the combination of S1a and S1b to the anode of diode 6. Thus, with S1a, S1b in position 2, voltage B, the supply voltage to transmitter 2, is connected to the input of the digital voltmeter and its value will be displayed by said meter. The output signal of transmitter 2 will be radiated via antenna 5 to the receiver-under-test 10 and if receiver 10 is receiving such signal, the audio frequency modulation supplied by transmitter 2 will be audible from the loudspeaker or headphones of receiver 10. Assuming that receiver 10, when adjusted to maximum gain, is detecting this audio modulation, the position of the wiper of potentiometer 4 is adjusted by the operator so as gradually to decrease voltage B until the receiver 10 is either no longer detecting the transmitted signal, i.e. no audio is heard at the output of receiver 10, or a minimum acceptable reading is obtained on the signal strength meter of a receiver having such a meter. The reading on the digital voltmeter 3 at this point will correspond directly to the minimum signal strength in connection with which receiver 10 is usable, provided that the output of transmitter 2 varies directly with the voltage B, as it would if a circuit such as that shown in FIG. 3 were used for transmitter 2. In this manner, an indirect measurement of transmitter 2's output power is obtained.

It is possible, alternatively, to directly measure the output power of transmitter 2. This may, for example, be accomplished by modifying the circuit of FIG. 2 such that the anode of diode 6 is always connected to antenna 5.

Referring now to FIG. 3, it will be observed that our invention is provided with a surface 11 having a region 12 upon which the receiver or transmitter under test is to be placed. We call region 12 the "sample tray." The location of sample tray 12 is defined by a boundary fence 13 which is provided for the purpose of defining the proper position for placement of the equipment under test. Antenna 5 is secured to the underside of surface 11 in the proximity of region 12. This assures that all receivers or transmitters of a given type and model of manufacture when placed in the same position with respect to boundary fence 13 will always be tested under conditions of similar distance and orientation with respect antenna 5, so that neither antenna orientation nor antenna-test unit separation will be variable factors influencing the strength of the transmitted and received signals. Therefore, there will be a constant field strength for the transmitted signal under either test condition for each given value of transmitting signal power. Thus, under ideal conditions all units of a given design or manufacturer's model should produce identical readings on the light emitting diode display of digital voltmeter 3.

Figure 4:
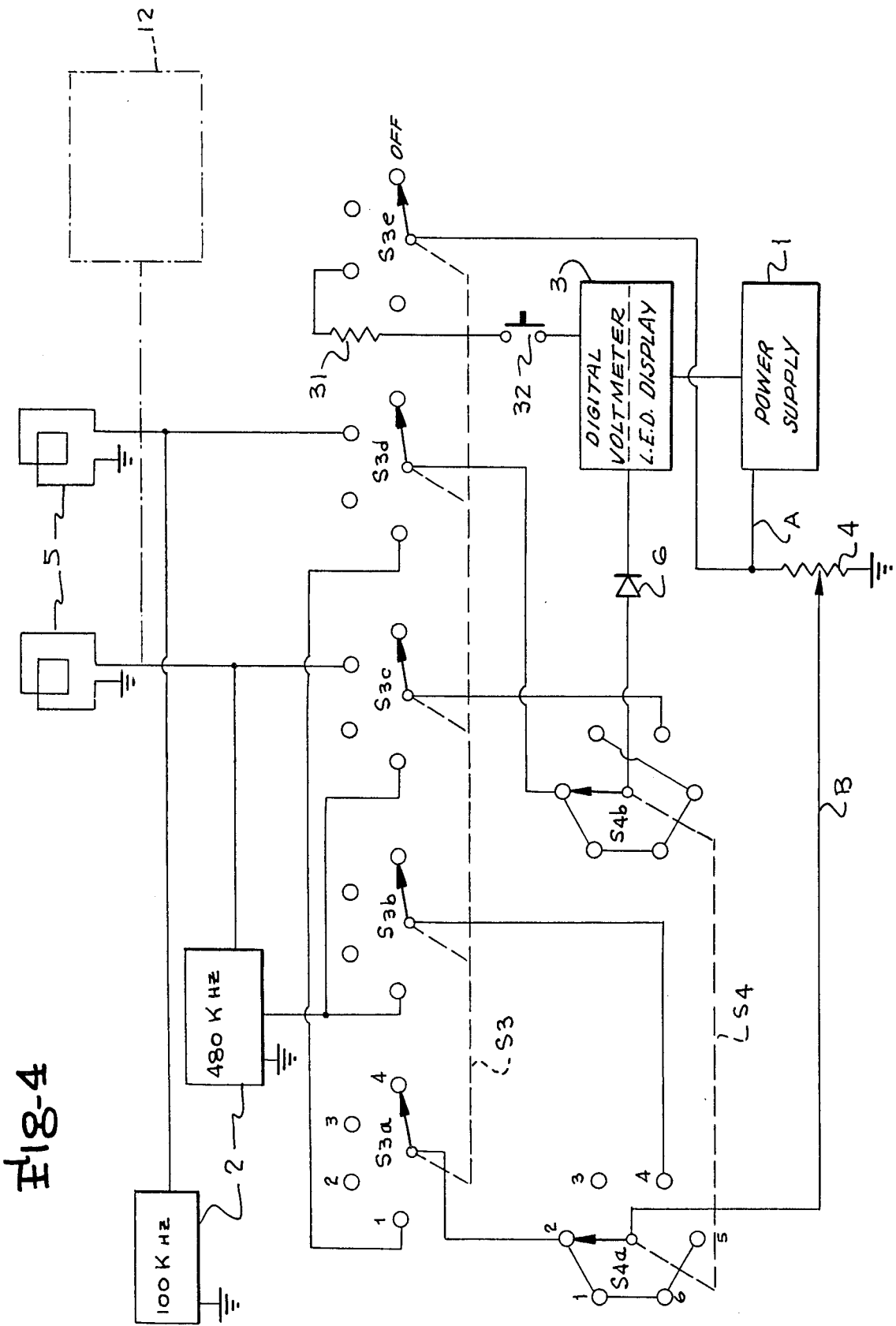
FIG. 4 is a combined block-circuit-diagrammatic representation of a second preferred embodiment of the invention.

The embodiment shown in FIG. 4 is essentially the same as that shown in FIG. 1, the principal exception being that the embodiment in FIG. 4 has two transmitters, for selective operation on two different frequencies, so that the apparatus shown may be used to test metal detectors which function on either frequency. For example, some commercially available units operate on 100 kHz. and others operate on 480 kHz. As FIG. 4 shows, a transmitter for each of the aforesaid frequencies may be provided. Antennas 5 are each connected to one of transmitters 2 and are intended to be resonant to the respective frequencies on which the transmitters are intended to operate. It will be appreciated by those skilled in the art that, with suitable modifications to the switching circuitry, this embodiment may be expanded to employ any number of transmitters operating on any number of different frequencies. Switch S3 corresponds to switch S1 of FIG. 1, with the addition of an off position and a test position, discussed below. Switch S4 selectively determines which of transmitters 2 and antennas 5 are, respectively, energized and connected to diode 6. According to the circuitry shown in FIG. 4, S4 has been wired such that each of its six positions corresponds to a particular model of manufacturer's equipment, so that a pointer knob may be attached to the shaft of switch S4 and the proper frequency may be selected merely by turning the pointer knob to designate the model of the equipment to be tested. As shown, with switch S4 in positions 1, 2, 5 and 6 metal detectors employing both a receiver and a transmitter operating on 100 kHz. may be tested. With switch S4 in position 3, the apparatus is adapted to test a metal detector of the type employing a transmitter alone and operating on 100 kHz. Finally, with switch S4 in position 4, both the transmitter and receiver sections of a metal detector operable on 480 kHz. may be tested.

It is further to be noted that power supply 1 and digital voltmeter 3 may be tested by placing switch S3 in position 2 and depressing pushbutton switch 32; this will connect the input of digital voltmeter 3 to the output of power supply 1 through resistor 31. This feature is especially desirable in the event power supply 1 is a battery operated power supply since it is then possible to determine whether the condition of the batteries has deteriorated to an unacceptable degree.

Although a particular embodiment of the invention has been described and illustrated herein, it is recognized that modifications, variations, and alternate embodiments may readily occur to those skilled in the art without departing from the spirit of the invention. Thus, it is intended that all such modifications and equivalents to the preferred embodiment are covered by the appended claims.

We claim:

1. A method for testing low power, low frequency devices used for locating metal objects or the like and equipped with, at least, a radio receiver, comprising the steps of:

selectively supplying variable voltage power to an input of voltage measuring means and to a power input connection of a low power, low frequency radio frequency transmitter unit for transmitting to said receiver, placing said receiver at a predetermined fixed location at a constant distance and orientation with respect to the antenna of said radio transmitter, tuning said receiver to receive the signal radiated from said radio transmitter, measuring an output voltage produced by the received signal at said receiver, adjusting the voltage of said supplied power to said transmitter to a predetermined value, decreasing the variable voltage of said supplied power until a minimum acceptable voltage output is obtained from the receiver and comparing the measurements of said supplied variable voltage corresponding to a minimum acceptable output from the receiver at which the receiver is functional with a predetermined value indicative of a properly functioning receiver whereby the receiver is determined to be operative or nonoperative.

* * * * *